United States Patent
Ogawa

(10) Patent No.: US 9,541,820 B2
(45) Date of Patent: Jan. 10, 2017

(54) LIGHT SOURCE UNIT INCLUDING AN AREA OF LUMINESCENT MATERIAL EMITTING LUMINESCENT LIGHT IN GREEN WAVELENGTH RANGE ON PART OF MEMBER SITUATED ON OPTICAL PATH OF LIGHT IN BLUE WAVELENGTH RANGE AND PROJECTOR

(71) Applicant: CASIO COMPUTER CO., LTD., Shibuya-ku, Tokyo (JP)

(72) Inventor: Masahiro Ogawa, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/469,812

(22) Filed: Aug. 27, 2014

(65) Prior Publication Data

US 2015/0062543 A1 Mar. 5, 2015

(30) Foreign Application Priority Data

Aug. 29, 2013 (JP) ................................ 2013-177538
Sep. 6, 2013 (JP) ................................ 2013-184942

(51) Int. Cl.
*F21K 99/00* (2016.01)
*F21V 9/10* (2006.01)
(Continued)

(52) U.S. Cl.
CPC ............. *G03B 21/204* (2013.01); *G03B 33/06* (2013.01)

(58) Field of Classification Search
CPC ............. G03B 21/204; G03B 21/2013; G03B 21/2033; G02B 26/008
(Continued)

(56) References Cited

U.S. PATENT DOCUMENTS

2010/0328625 A1 12/2010 Miyazaki et al.
2011/0063581 A1* 3/2011 Iwanaga ............... G03B 21/204
353/31
(Continued)

FOREIGN PATENT DOCUMENTS

CN 101937166 A 1/2011
CN EP 2740997 A1 * 6/2014 ........... G03B 21/204
(Continued)

OTHER PUBLICATIONS

Chinese Office Action (and English translation thereof) dated Sep. 29, 2015, issued in counterpart Chinese Application No. 201410437330.7.

*Primary Examiner* — Bao-Luan Le
*Assistant Examiner* — Christopher Lamb, II
(74) *Attorney, Agent, or Firm* — Holtz, Holtz & Volek PC

(57) ABSTRACT

A light source unit includes a solid light emitting element that emits light in the blue wavelength range, a luminous light emitting portion on which a luminescent material layer is laid out, the luminescent material layer using the light emitted from the solid light emitting element as excitation light to emit light in a wavelength range of which wavelengths are longer than a wavelength of the excitation light, and a light transmitting portion that transmits the light emitted from the solid light emitting element, and an area of a luminescent material that emits luminous light in the green wavelength range is provided at part of the light transmitting portion.

7 Claims, 9 Drawing Sheets

(51) Int. Cl.
*G03B 21/20* (2006.01)
*G03B 33/06* (2006.01)

(58) Field of Classification Search
USPC .............................................. 362/84; 353/84
See application file for complete search history.

(56) References Cited

U.S. PATENT DOCUMENTS

| | | | |
|---|---|---|---|
| 2011/0205502 A1* | 8/2011 | Kato | G03B 21/14 353/84 |
| 2011/0292349 A1* | 12/2011 | Kitano | G03B 21/20 353/31 |
| 2012/0026472 A1* | 2/2012 | Masuda | G03B 21/204 353/85 |
| 2014/0375959 A1* | 12/2014 | Yang | G03B 21/204 353/31 |

FOREIGN PATENT DOCUMENTS

| | | |
|---|---|---|
| JP | 2002090883 A | 3/2002 |
| JP | 2011175000 A | 9/2011 |

* cited by examiner

LIGHT SOURCE UNIT INCLUDING AN AREA OF LUMINESCENT MATERIAL EMITTING LUMINESCENT LIGHT IN GREEN WAVELENGTH RANGE ON PART OF MEMBER SITUATED ON OPTICAL PATH OF LIGHT IN BLUE WAVELENGTH RANGE AND PROJECTOR

CROSS-REFERENCE TO RELATED APPLICATION

This application is based upon and claims the benefit of priority under 35 USC 119 from Japanese Patent Application No. 2013-177538 filed on Aug. 29, 2013, and Japanese Patent Application No. 2013-184942 filed on Sep. 6, 2013, the entire disclosures of which, including the descriptions, claims, drawings and abstracts, are incorporated herein by reference.

BACKGROUND OF THE INVENTION

Field of the Invention

The present invention relates to a light source unit including an area of a luminescent material that emits luminescent light in the green wavelength range on part of a member that is situated on an optical path of light in the blue wavelength range, and a projector.

Description of the Related Art

Japanese Unexamined Patent Publication No. 2011-175000 (JP-2011-175000 A) discloses a projector utilizing a field sequential system (a time-division system) in which beams of light of a plurality colors (red, green, blue, white) are shone on to a display element repeatedly and the beams of light of the plurality of colors that are modulated by the display element are then combined on a time basis to thereby generate a colored image.

Japanese Unexamined Patent Publication No. 2002-90883 (JP-2002-90883 A) discloses a projector in which light emitted by a high pressure mercury-vapor lamp is shone on to a wavelength conversion optical element where the light is turned reddish or greenish and the light whose color is corrected in this way by the wavelength conversion optical element is shone on to a light valve, so that light that has passed through the light valve is projected.

Incidentally, it happens occasionally that blue light from a blue light source does not form ideal blue light. Namely, the blue light from the blue light source contains light of a short wavelength, in which case the blue light looks purplish blue. In the event that the blue light source is used for the blue light source described in Patent Document 1 (JP-2011-175000 A), the color balance will be lost.

Then, a problem that the invention is to solve is that even though blue light that is emitted from a blue light source looks purplish blue, the blue light can be corrected to be close to the ideal blue.

With a view to solving the problems, the invention provides a light source unit including a blue light source that emits blue light, an optical plate that intersects an axis of the blue light emitted by the blue light source and on which a luminescent area and a light transmission area are provided along a circumferential direction that passes through a point of intersection with the axis of the blue light, a rotational driving device that rotates the optical plate in the circumferential direction, and a wavelength range adding filter that is provided on an optical path of the blue light that is emitted from the blue light source and that passes through the light transmission area for adding light in a wavelength range of which wavelengths are longer than the wavelength of the blue light to the blue light.

According to the invention, even though the blue light that is emitted by the blue light source looks purplish blue, since the light in the wavelength range of which the wavelengths are longer than the wavelength of the blue light is combined with the blue light, the light that passes through the wavelength range adding filter is corrected to be close to the ideal blue.

SUMMARY OF THE INVENTION

According to an aspect of the invention, there is provided a light source unit including a solid light emitting element that emits light in the blue wavelength range, a luminous light emitting portion on which a luminescent material layer is laid out, the luminescent material layer using the light emitted from the solid light emitting element as excitation light to emit light in a wavelength range of which wavelengths are longer than a wavelength of the excitation light, and a light transmitting portion that transmits the light emitted from the solid light emitting element, wherein an area of a luminescent material that emits luminous light in the green wavelength range is provided at part of the light transmitting portion.

BRIEF DESCRIPTION OF THE SEVERAL VIEWS OF THE DRAWINGS

FIG. 4 shows drawings depicting a luminous light emitting device in a light source unit provided in the projector according to the first embodiment, in which

DETAILED DESCRIPTION OF THE PREFERRED EMBODIMENTS

Hereinafter, a best mode for carrying out the invention will be described by the use of the accompanying drawings. Although the following embodiments have various preferred technical limitations for carrying out the invention, those technical limitations are not intended to limit the scope of the invention to the embodiments and illustrated examples.

First Embodiment

Figure 1:
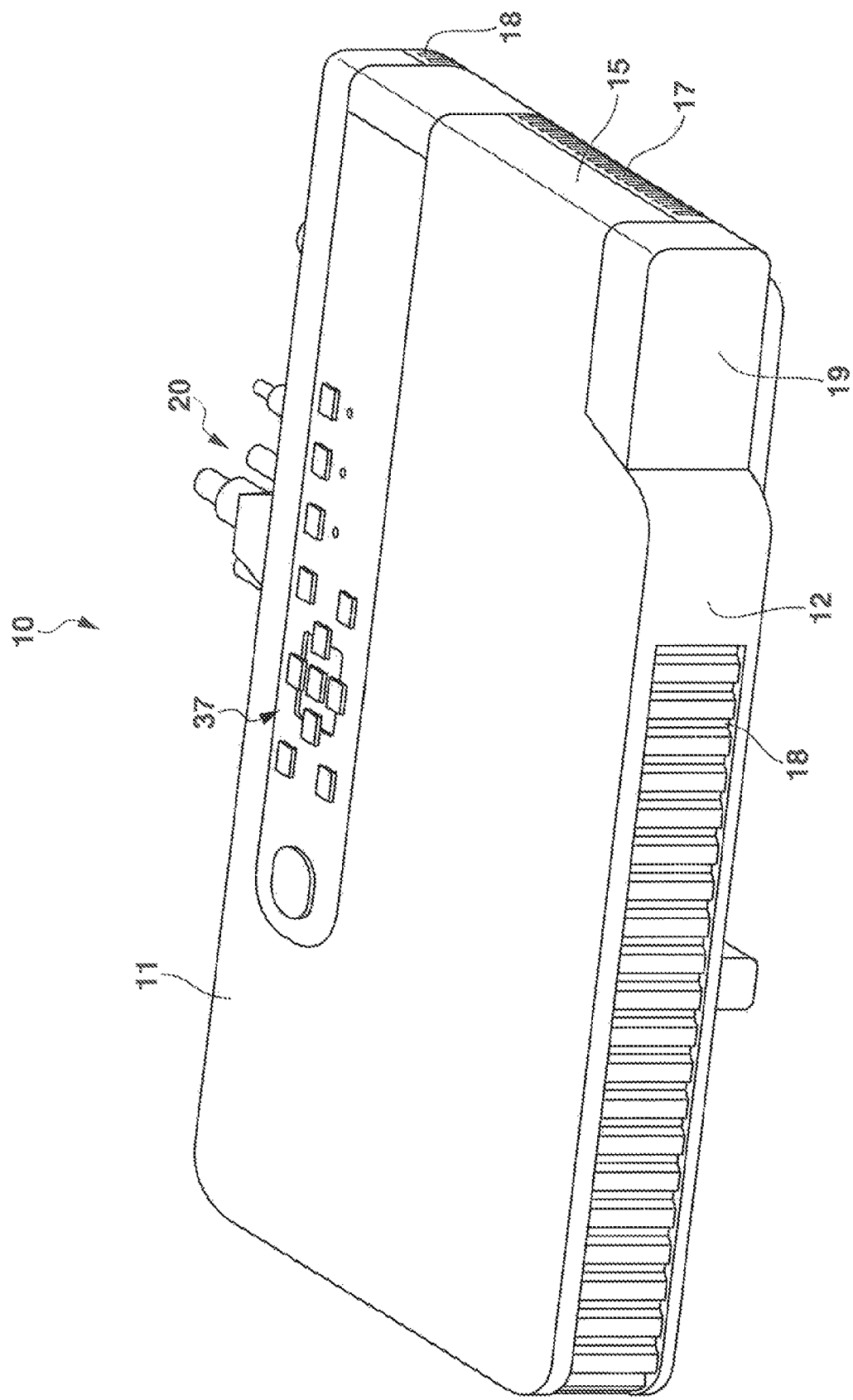
FIG. 1 is an external perspective view of a projector according to a first embodiment.

Hereinafter, a first embodiment will be described in detail based on the drawings. FIG. 1 is an external perspective view of a projector 10. In this embodiment, when referred to in relation to the projector 10, left and right denote, respectively, left and right in relation to the projecting direction of the projector 10, and when referred to in relation to the projector 10, front and rear denote, respectively, front and rear in relation to the direction of a screen and a traveling direction of a pencil of light that is emitted from the projector 10 towards the screen.

As shown in FIG. 1, the projector 10 according to the first embodiment has a substantially rectangular parallelepiped shape. The projector 10 has a lens cover 19 which covers a projection port which is disposed to a side of a front panel 12 which is referred to as a front side panel of a main body casing of the projector 10. Additionally, a plurality of outside air inlet slits 18 are provided in the front panel 12. Further, although not shown, the projector 10 includes an IR reception unit which receives a control signal from a remote controller, and the IR reception unit is attached to the front panel 12.

In addition, a keys/indicators unit 37 is provided on an upper panel 11 of the main body casing. Disposed on this keys/indicators unit 37 are keys and indicators which include a power supply switch key, a power indicator, a projection switch key, an overheat indicator, and the like. The power indicator informs whether the projector 10 is on or off. The projection switch key switches on or off the projection by the projector 10. The overheat indicator informs of an overheat condition occurring in a light source unit, a display element, a control unit or the like when they really overheat. Additionally, the upper panel 11 covers an upper surface and part of a left-hand side surface of the casing of the projector 10 and is configured as a panel that can be opened to deal with a failure when it occurs.

Further, provided in a back side or back panel of the casing are an input/output connector unit where USB terminals, a video signal input D-SUB terminal, an S terminal, an RCA terminal and the like are provided and various types of terminals 20 including a power supply adaptor plug and the like. Additionally, a plurality of outside air inlet slits 18 are formed in the back panel of the casing. A plurality of inside air outlet slits 17 are formed in each of a right-hand panel, not shown, which is a side panel of the casing and a left-hand panel 15 which is a side panel shown in FIG. 1. In addition, outside air inlet slits 18 are also formed in a corner portion of the left-hand panel 15 which is formed between the back panel and itself. Further, a plurality of outside air inlet slits or inside air outlet slits are formed in each of portions of a lower panel, not shown, that lie near the front panel, the back panel, the left-hand panel and the right-hand panel. It is noted that the right-hand panel and the left-hand panel 15 are formed when the upper panel 11 and a bottom panel are assembled together.

Figure 2:
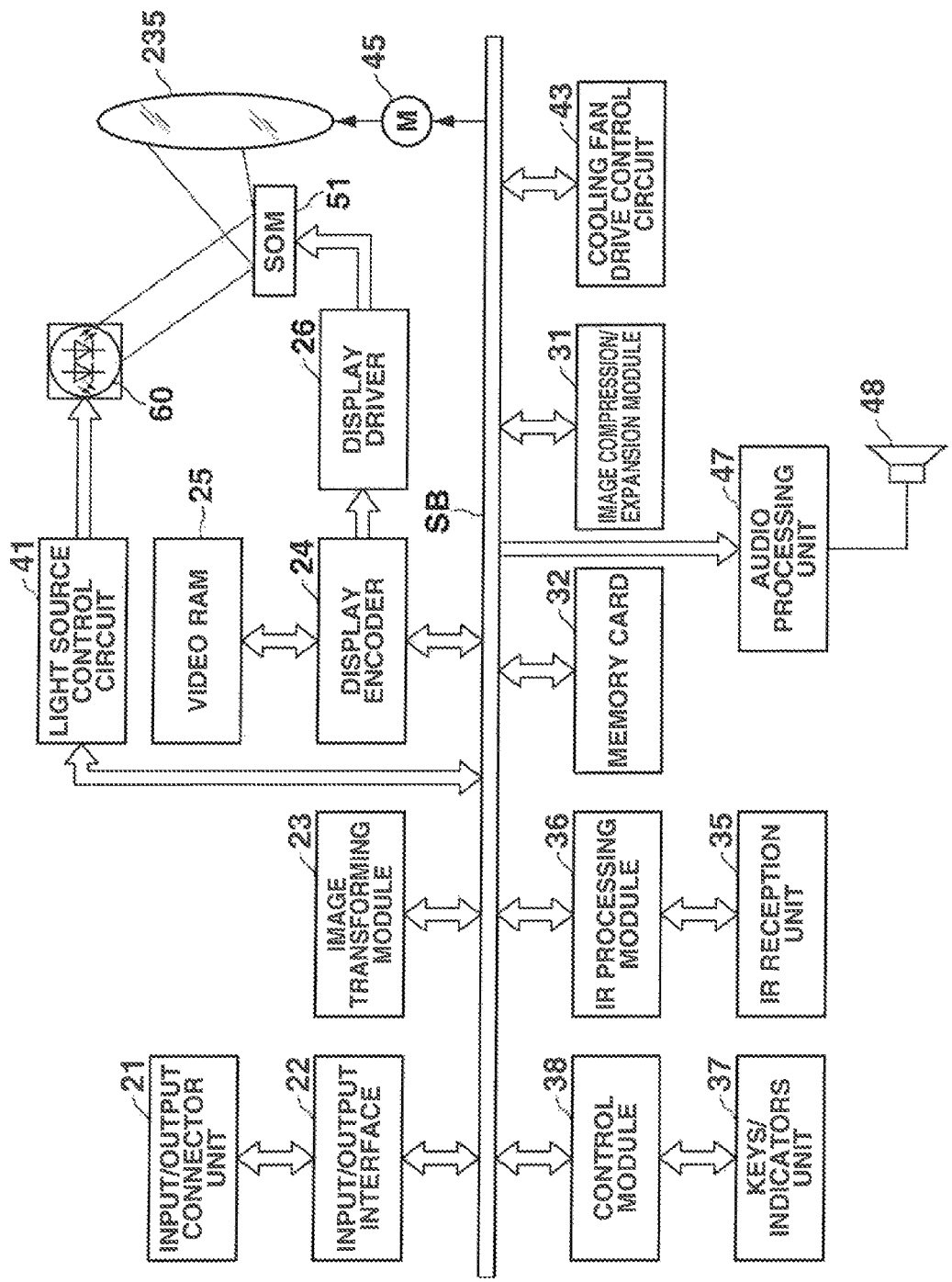
FIG. 2 is a functional circuit block diagram of the projector according to the first embodiment.

Next, a projector control unit of the projector 10 will be described by the use of a functional block diagram shown in FIG. 2. The projector control unit includes a control module 38, an input/output interface 22, an image transforming module 23, a display encoder 24, a display driver 26 and the like.

This control module 38 governs the control of respective operations of circuitries within the projector 10 and is made up of a CPU which is a controller, a ROM which stores in a fixed fashion operation programs of various types of settings, a RAM which is used as a working memory and the like.

An input/output connector unit 21 is connected to the input/output interface 22. Image signals of various standards which are inputted from the input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26. The display driver 26 drives a display element 51, which is a spatial optical modulator (SOM), at an appropriate frame rate in response to the image signal outputted from the display encoder 24. In this projector 10, a pencil of light that is emitted from a light source unit 60 is shone onto the display element 51 via a light source-side optical system, whereby an optical image is formed by using reflected light that is reflected by the display element 51. The image so formed is then projected on to a projection surface for display thereon via a projection-side optical system. In addition, a movable lens group 235 of the projection-side optical system is driven by a lens motor 45 for zooming or focusing.

When in a reproducing mode, an image compression/expansion module 31 performs the following operation. Specifically, the image compression/expansion module 31 reads out image data recorded on a memory card 32 and expands individual image data which make up a series of dynamic images frame by frame. Then, the image compression/expansion module 31 outputs the image data to the display encoder 24 via the image transforming module 23 so as to enable the display of dynamic images and the like based on the image data stored on the memory card 32.

Operation signals generated at the keys/indicators unit 37 which includes the main keys and indicators which are provided on the upper panel 11 of the main body casing of the projector 10 are sent out directly to the control module 38. Key operated signals from the remote controller are received by the IR reception unit 35, and a code signal demodulated at an IR processing module 36 is outputted to the control module 38.

The control module 38 controls a light source control circuit 41 which is configured as a light source control unit. This light source control circuit 41 controls the illumination of laser light emitting elements installed in a laser light source module 70 as a light source device which will be described later in a time-dividing fashion so that light source lights in the predetermined ranges of wavelengths which are required in producing an image are emitted from the light source unit 60. The light source control circuit 41 controls a wheel motor 110 which is a driving device. Additionally, the light source control circuit 41 controls the illumination of a red light emitting diode 121 of a red light source device 120. Further, the control module 38 causes a cooling fan drive control circuit 43 to detect temperatures through a plurality of temperature sensors which are provided in the light source unit 60 and the like so as to control the rotating speed of cooling fans based on the results of the temperature detections.

In addition, an audio processing unit 47 is connected to the control module 38 via a system bus (SB). This audio processing module 47 includes a circuitry for a sound source such as a PCM sound source or the like. When in a projection mode and a reproducing mode, the audio processing unit 47 converts audio data into analog signals and drives a speaker 48 to output loudly sound or voice based on the audio data.

Figure 3:
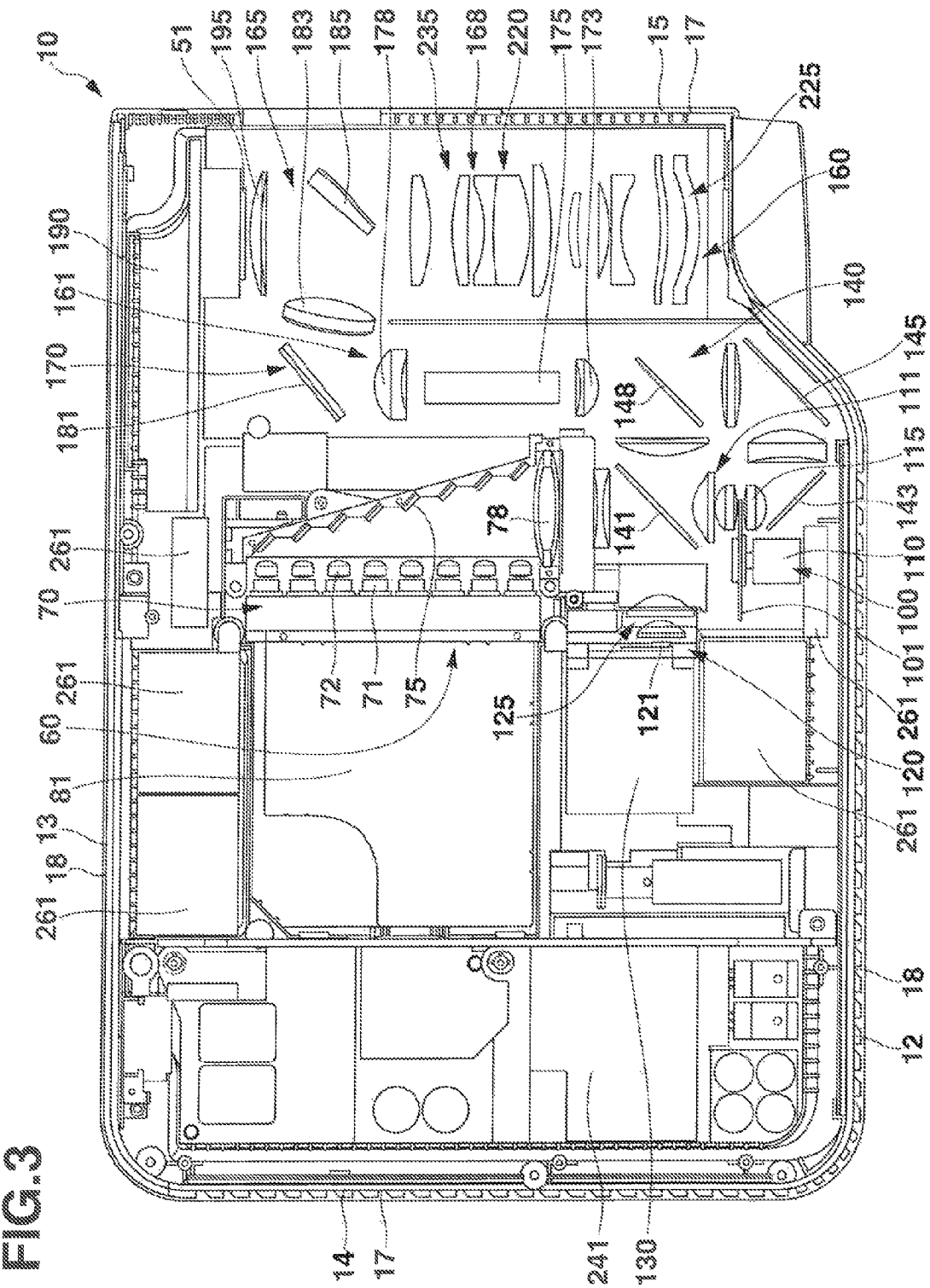
FIG. 3 is a schematic plan view showing an internal construction of the projector according to the first embodiment.

Next, an internal construction of the projector 10 will be described. FIG. 3 is a schematic plan view showing an internal construction of the projector 10. As shown in FIG. 3, the projector 10 includes a control circuit board 241 that is provided near the right-hand panel 14. This control circuit board 241 includes a power supply circuit block, a light source control block and the like. Additionally, the projector 10 includes the light source unit 60 that is provided to a side of the control circuit board 241, that is, in a central portion of the housing of the projector 10.

Further, in the casing of the projector 10, an illumination-side optical block 161 is disposed to the left of the laser light source module 70 that is provided in the light source unit 60. This illumination-side optical block 161 makes up part of a light source-side optical system 170 which is an optical system that guides light emitted from the light source unit 60 to the display element 51. Additionally, an image generating optical block 165 is disposed near a position where the back panel 13 intersects the left-hand panel 15. The image generating optical block 165 includes part of the light source-side optical system 170, the display element 51, and part of a projection-side optical system 220 that is an optical system that projects projection light generated in the display element 51 on to a screen. Further, a projection-side optical block 168 is disposed at the front of the image generating optical block 165, and this projection-side optical block 168 includes the projection-side optical system 220.

The light source-side optical system 170 that is included in the illumination-side optical block 161 includes a light tunnel 175 that uniformizes intensity of light emerging from the light source unit, a collective lens 178 that concentrates light emerging from the light tunnel 175, a light axis changing mirror 181 and the like. The light axis changing mirror 181 changes the axis of a pencil of light which passes through the collective lens 178 in the direction of the image generating optical block 165.

The light source-side optical system 170 that is included in the image generating optical block 165 includes a collective lens 183 and a shining mirror 185. The collective lens 183 concentrates light source light that is reflected on the light axis changing mirror 181 on to the display element 51, and the shining mirror 185 shines a pencil of light that passes through the collective lens 183 onto the display element 51 at a predetermined angle. Additionally, in the image generating optical block 165, a cooling device 190 such as a heat sink which cools the display element 51 is disposed between a DMD which is the display element 51 and the back panel 13. The display element 51 is cooled by this heat sink. In addition, a condenser lens 195 that makes up part of the projection-side optical system 220 is disposed in the proximity of the front of the display element 51.

The projection-side optical block 168 includes, as part of the projection-side optical system 220, a fixed lens group 225 that is incorporated in a fixed lens barrel and the movable lens group 235 which is incorporated in a movable lens barrel. Additionally, the projection-side optical system 220 is configured as a variable-focus lens with a zooming function, and zooming and focusing can be executed by moving the movable lens group 235 by the lens motor.

Next, the light source unit 60 of the first embodiment will be described in detail. The light source unit 60 has the laser light source module 70 that emits light in the blue wavelength range and a luminous light emitting device 100. The luminous light emitting device 100 has an optical plate 101 and the wheel motor 110. The optical plate 101 has a function to transmit light in the blue wavelength range that is emitted from the laser light source module 70 while diffusing it and a function to generate green luminous light by using the light in the blue wavelength range as excitation light. The wheel motor 110 has a function as a rotational driving device that moves the optical plate 101.

Further, the light source unit 60 includes the red light source device 120, a light guiding optical system 140, a cooling device 81 and a cooling fan 261 which both cool the laser light source module 70, a cooling fan 261 that cools the luminous light emitting device 100 including the optical plate 101, and the like. The red light source device 120 is disposed between the laser light source module 70 and the luminous light emitting device 100. The light guiding optical system 140 changes the directions of the axis of light emitted from the luminous light emitting device 100 and the axis of light emitted from the red light source device 120 so that the axes of the lights are directed in the same direction and concentrates the lights of the individual colors to an incident entrance to the light tunnel 175.

The laser light source module 70 is alight source module which includes a plurality of laser light emitting elements 71 that are solid light emitting elements. The laser light source module 70 is disposed in a substantially central portion in relation to a left-to-right direction of the casing of the projector 10 and near the back panel 13 so that axes of lights emitted from the laser emitting elements 71 become parallel to the back panel 13. Additionally, as shown in FIG. 3, collimator lenses 72 are disposed individually at the front of the corresponding laser light emitting elements 71. Specifically, the laser light source module 70 includes 24 blue laser light emitting elements 71 that are arranged in a check pattern (so as to lie alternately adjacent to each other vertically and horizontally).

A plurality of reflecting mirrors 75 are arranged as in steps of a staircase in front of the corresponding laser light emitting elements 71. The reflecting mirrors 75 constitute part of the light guiding optical system 140 and change the directions of axes of lights emitted from the laser light emitting elements 71 by 90 degrees in the direction of the front panel 12. The collective lens 78 is disposed on the axes of the laser beams which are reflected by the reflecting mirrors 75.

The plurality of reflecting mirrors 75 reflect the lights emitted from the laser light emitting elements 71 so as to narrow distances between the lights so that a sectional area of a pencil of laser light emitted from the laser light source module 70 is small. Additionally, a cooling device 81 such as a heat sink or the like is disposed between the laser light source module 70 and the right-hand panel 14 so as to cool the laser light source module 70. A cooling fan 261 is disposed between the heat sink and the back panel 13.

The laser light emitting elements 71 that constitute the light source are cooled by the cooling fan 261 that is disposed between the heat sink, which is the cooling device 81, and the back panel 13 and the cooling device 81. Further, a cooling fan 261 is also disposed between the group of reflecting mirrors 75 and the back panel 13, and the group of reflecting mirrors 75 and the collective lens 78 are cooled by this cooling fan 261.

The luminous light emitting device 100 includes the optical plate 101, the wheel motor 110, a collective lens group 111, and a collective lens 115. The optical plate 101 is disposed so as to be parallel to the front panel 12, that is, so as to be at right angles to the axis of the light emitted from the laser light source module 70. The wheel motor 110 is the rotational driving device that drives to rotate the optical plate 101. The collective lens group 111 concentrates the pencil of light emitted from the laser light source module 70 to the optical plate 101 and concentrates a pencil of light emitted from the optical plate 101 in the direction of the back panel 13. The collective lens 115 concentrates a pencil of light emitted from the optical plate 101 in the direction of the front panel 12.

Figure 4A:
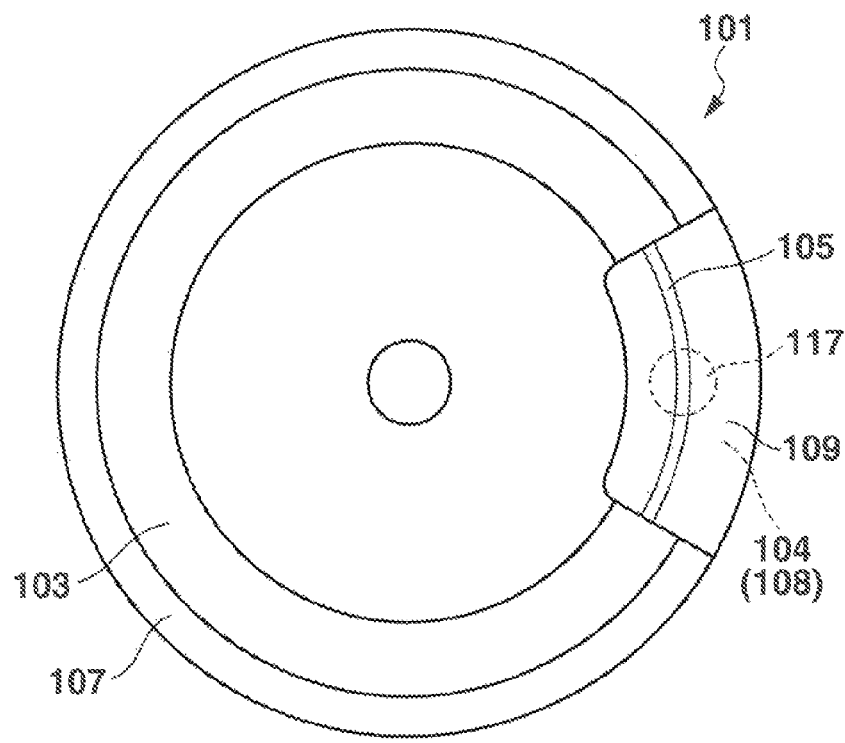
FIG. 4A is a plan view of an optical plate.
Figure 4B:
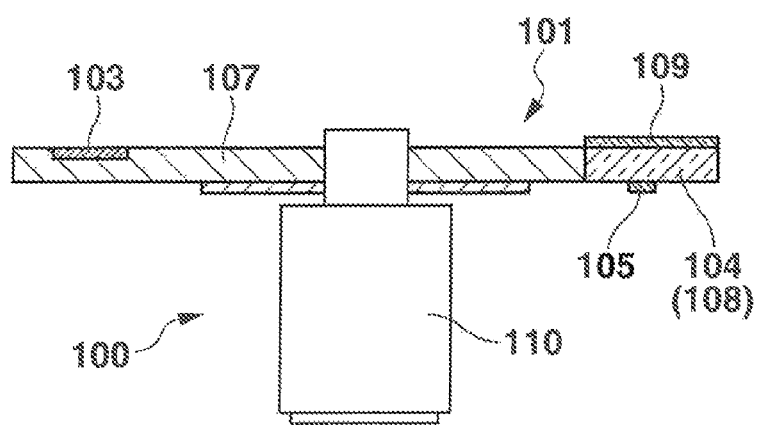
FIG. 4B is a partially sectional schematic side view of the optical plate.

As shown in FIG. 3, the optical plate 101 of the luminous light emitting device 100 is disposed so that part of the optical plate 101 is positioned on an optical path of the light reflected by the reflecting mirrors 75 after being emitted from the laser light source module 70. Then, on this optical plate 101, as shown in FIGS. 4A, 4B, a luminous light emitting portion 103 and a transmitting portion 104 are provided in an end-to-end fashion in a circumferential direction. A luminous light emitting material is applied to the luminous light emitting portion 103, and this luminous light emitting material receives the light in the blue wavelength range emitted from the laser light emitting module 70 to emit light having a wavelength in the green wavelength range. The transmitting portion 104 transmits the light emitted from the laser light source module 70 while diffusing it.

A base material of the optical plate 101, which is a rotary wheel, is a metallic base material which is made up of copper, aluminum or the like. An annular groove is formed on a surface of the base material 107 of the rotary plate which lies on a side facing the laser light source module 70. A bottom portion of this groove is mirror finished through silver deposition or the like, and a layer of green luminescent material is laid out on a surface of the mirror finished groove. Thus, the luminous light emitting portion 103 is formed.

This green luminescent material layer is made up of a green luminescent material such as YAG or the like which emits luminous light having a wavelength in the green wavelength range by receiving the light in the blue wavelength range that is emitted from the laser light source module 70 as excitation light and a transparent binder such as glass in which the green luminescent material is uniformly scattered.

Then, the light in the blue wavelength range that is emitted from the laser light source module 70 to be shone on to the luminous light emitting portion 103 where the green luminescent material layer is laid out to make the optical plate 101 into a green light source device 80 excites the green luminescent material in the green luminescent material layer. Pencils of light which are luminescently emitted in every direction from the green luminescent material are directed directly towards the back panel 13 or directed towards the back panel 13 after having been reflected on the bottom surface of the groove portion on the optical plate 101 to thereby be incident on the collective lens group 111.

Further, in the transmitting portion 104, a transparent base material 108 such as glass having light transmitting characteristics is fitted in a cut-out through hole portion in the base material 107 of the rotary plate, and micro irregularities are formed on a surface of the transparent base material 108 through sand blasting or the like, whereby the transmitting portion 104 is made into a diffusive plate.

Figure 5:
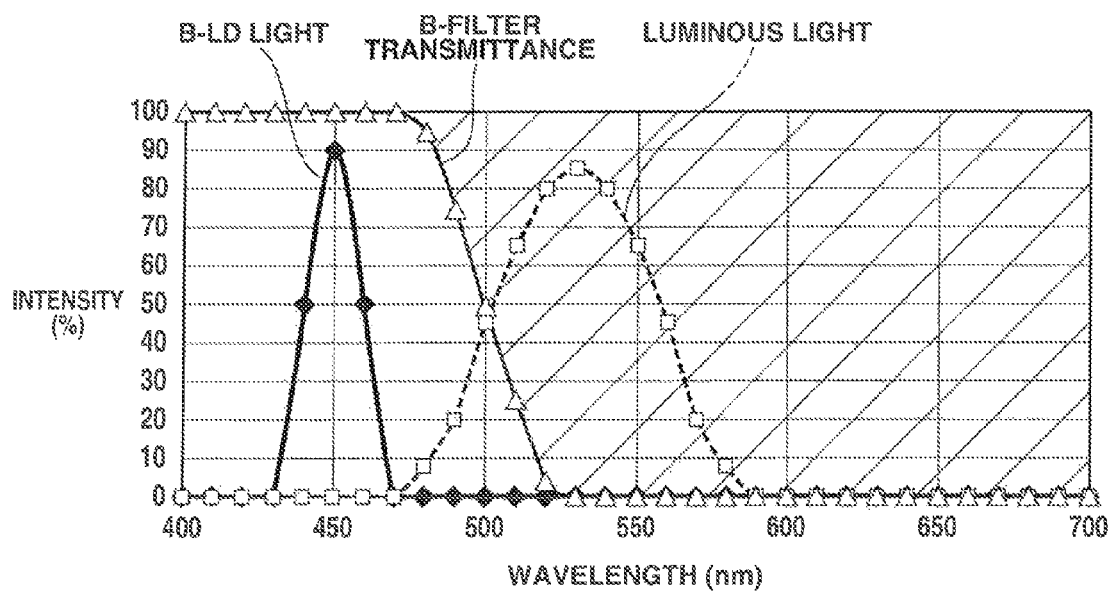
FIG. 5 is a chart showing characteristics of a blue transmitting filter in the light source unit provided in the projector according to the first embodiment.

As shown in FIG. 4B, a blue transmitting filter 109 is formed on a whole surface of a side of the transmitting portion 104 that lies to face the back panel 13. This blue transmitting filter 109 transmits and absorbs light in the blue wavelength range based on a wavelength of 500 nm as a boundary. Specifically, the blue transmitting filter 109 transmits light whose wavelength is shorter than 500 nm and absorbs light whose wavelength is 500 nm or longer. As shown in FIG. 5, in the blue transmitting filter 109, the transmittance starts to be reduced from a wavelength of about 470 nm, and light whose wavelength is about 525 nm or longer is completely cut off by being absorbed by the filter.

Further, an auxiliary luminescent portion 105 is provided on a side of the transmitting portion 104 that lies to face the front panel 12. This auxiliary luminescent portion 105 is formed by applying a luminescent material that emits light in the green wavelength range to the transparent base material in such a way as to form an arc-shaped line that is concentric with the luminous light emitting portion 103 about the center of the optical plate 101 as the center of an arc, and the width of the arc-shaped line is thinner than a width of an excitation light spot 117 where the light in the blue wavelength range from the laser light source module 70 is shone on to the optical plate 101 via the collection lens group 111. Although the auxiliary luminescent portion 105 is described as being formed on the surface of the transmitting portion 104, the invention is not limited thereto, and hence, a configuration may be adopted in which the blue transmitting filter 109 is not provided on the surface of the transmitting portion 104 on which light is incident but is provided on the surface of the transmitting portion 104 from which light emits and the auxiliary luminescent portion 105 is formed on part of the blue transmitting filter 109.

Because of this, when the light in the blue wavelength range from the laser light source module 70 that is shone on to the transmitting portion 104 of the optical plate 101 passes through the blue transmitting filter 109 and further passes through the diffusive plate which is the transmitting portion 104, the blue light is diffused by the micro irregularities on the diffusive plate and the diffused light passes through the transmitting portion 104 of the optical plate 101 to be incident on the collective lens 115 that lies to face the front panel 12.

Additionally, part of the light in the blue wavelength range from the laser light source module 70 that is shone on to the transmitting portion 104 on the optical plate 104 passes through the blue transmitting filter 109 to be absorbed by the green luminescent material of the auxiliary luminescent portion 105, whereby luminous light in the green wavelength range is emitted from the green luminescent material.

Figure 6:
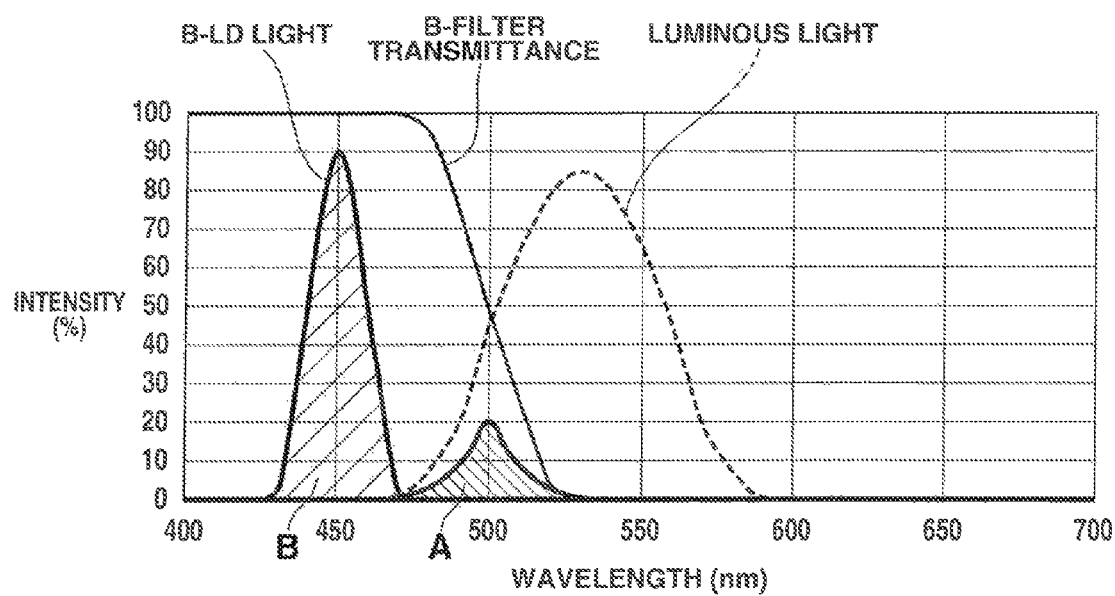
FIG. 6 is a chart showing blue wavelength characteristics in the light source unit provided in the projector according to the first embodiment.

In the luminous light emitted from the auxiliary luminescent portion 105, although the luminous light that is emitted in the direction of the back panel 13 passes through the transmitting portion 104 on the optical plate 101, only light having a wavelength of about 500 nm that falls in an area A shown in FIG. 6 is emitted from the luminous light emitting device 100 by virtue of the blue transmitting filter 109.

Namely, as to the luminous light emitted from the auxiliary luminescent portion 105 that has its peak wavelength at 530 nm, the light having the wavelength of about 500 nm passes through the blue emitting filter 109 as shown by the area A, and this amounts to a quantity of light that is equal to or less than about 50% of the luminous light emitted from the auxiliary luminescent portion 105. Thus, much of the luminous light from the auxiliary luminescent portion 105 is absorbed by the blue transmitting filter 109.

In the luminous light emitted from the auxiliary luminescent portion 105, the luminous light that is emitted in the direction of the front panel 12 passes through the collective lens 115 together with the laser light in the blue wavelength range that passes through the transmitting portion 104 while being diffused to be incident on a first reflecting mirror 143 that is disposed on a side of the luminous light emitting device 100 that faces the front panel 12.

A blue reflecting filter is provided on a surface of the first reflecting mirror 143. The first reflecting mirror 143 reflects light whose wavelength is shorter than about 500 nm and allows light whose wavelength is about 500 nm or longer to pass through the blue reflecting filter.

Because of this, the first reflecting mirror 143 reflects all of the light in the blue wavelength range from the laser light source module 70 that has its peak wavelength at about 450 nm as shown by an area B in FIG. 6 although the area B in FIG. 6 shows an area of transmitted light. As to the luminous light emitted from the auxiliary luminescent portion 105 that has its peak wavelength at about 530 nm, similar to the luminous light that is emitted to the side facing the back panel 13, 50% or less of part of the luminous light that is shown as the light having the wavelength of about 500 nm that falls in the area A is reflected by the first reflecting mirror 143, and the first reflecting filter 143 allows much of the luminous light to pass through the blue reflecting filter.

A cooling fan 261 is disposed between the wheel motor 110 and the front panel 12, and the luminous light emitting device 100 and the like are cooled by this cooling fan 261.

The red light source device 120 is a monochromatic light emitting device and includes a red light emitting diode 121 that is a solid light emitting element disposed so that an optical axis becomes parallel to the blue laser light emitting elements 71 and a collective lens group 125 that collects light emitted from the red light emitting diode 121. This red light emitting diode 121 is a light emitting diode that emits light in the red wavelength range.

This red light source device 120 is disposed so that the axis of the light emitted from the laser light source module 70 and the axis of the light in the green wavelength range that is emitted from the optical plate 101 intersect the axis of the light in the red wavelength range that is emitted from the red light source device 120.

Further, the red light source device 120 includes a heat sink 130 that is disposed on a side of the red light emitting diode 121 that faces the right-hand panel 14. Additionally, a cooling fan 261 is disposed between the heat sink 130 and the front panel 12, and the red light emitting diode 121 that is a red light source is cooled by this cooling fan 261.

The light guiding optical system 140 includes the collective lenses that collect pencils of light in the blue, green and red wavelength ranges, the reflecting mirrors that change the directions of the axes of the pencils of light in the respective wavelength ranges so as to be directed in the same direction, dichroic mirrors and the like. Being configured in this way, the light guiding optical system 140 guides the light emitted from the laser light source module 70, the light emitted from the optical plate 101 of the luminous light emitting device 100 and the light emitted from the red light source device 120 so as to be incident on the light tunnel 175 of the light source-side optical system 170, by cooperating with the reflecting mirrors 75 and the collective lens 78 that reflect and collects the lights emitted from the laser light emitting elements 71 within the laser light source module 70.

Specifically, the light guiding optical system 140 has the reflecting mirrors 75 and the collective lens 78 in the laser light source module 70 and has further a first dichroic mirror 141 in a position where the light in the blue wavelength range that is emitted from the laser light source module 70, the light in the green wavelength range that is emitted from the optical plate 101 to the side facing the laser light source module 70, and the light in the red wavelength range that is emitted from the red light source device 120 intersect each other. This first dichroic mirror 141 transmits the light in the blue wavelength range and the light in the red wavelength range and reflects the light in the green wavelength range that is emitted from the luminous light emitting device 100, changing the direction of the axis of the green light by 90 degrees in the direction of the left-hand panel 15.

In addition, as the light guiding optical system 140, the first reflecting mirror 143 is disposed on the axis of the light in the blue wavelength range that passes through the optical plate 101 while being diffused, that is, between the collective lens 115 and the front panel 12. This first reflecting mirror 143 reflects the light in the blue wavelength range to change the direction of the axis of the blue light by 90 degrees in the direction of the left-hand panel 15.

Since the blue reflecting filter is provided on the surface of the first reflecting mirror 143, the first reflecting mirror 143 reflects the light in the blue wavelength range and part of the luminous light that is emitted from the auxiliary luminescent portion 105 in the direction of the left-hand panel 15.

Further, a second reflecting mirror 145 is disposed on the axes of the light in the blue wavelength range and the luminous light that are reflected by the first reflecting mirror 143 and near the optical system unit 160, and the second reflecting mirror 145 changes the directions of the axes of the blue light and the luminous light by 90 degrees in the direction of the back panel 13.

Further, the light guiding optical system 140 has a second dichroic mirror 148 that is disposed in a position where the axis of the light in the red wavelength range that passes through the first dichroic mirror 141, the axis of the light in the green wavelength range that is reflected by the first dichroic mirror 141 so that the axis thereof coincides with the axis of the light in the red wavelength range, and the axes of the light in the blue wavelength range and the luminous light that are reflected by the second reflecting mirror 145 intersect each other. This second dichroic mirror 148 transmits the light in the blue wavelength range and reflects the light in the red wavelength range and the light in the green wavelength range so as to change the directions of the axes of the red light and the green light by 90 degrees in the direction of the back panel 13.

This dichroic mirror 148 transmits the light in the blue wavelength range and reflects the light in the red wavelength range and the light in the green wavelength range and switches the transmission and the reflection between the blue wavelength range and the green wavelength range. Therefore, the luminous light that is reflected by the first reflecting mirror 141 and the second reflecting mirror 145 so as to be incident on the second dichroic mirror 148 is partially reflected, and only part thereof is allowed to pass through the second dichroic mirror 148.

However, the luminous light emitted from the auxiliary luminescent portion 105 is also emitted from the optical plate 101 in the direction of the first dichroic mirror 141, and hence, some of the luminous light passes through the blue transmitting filter 109 provided on the surface of the transmitting portion 104 and is reflected by the first dichroic mirror 141 to be incident on the second dichroic mirror 148. Part of the luminous light that is reflected by the first dichroic mirror 141 to be incident on the second dichroic mirror 148 passes through the second dichroic mirror 148 and another part is reflected by the second dichroic mirror 148.

Because of this, the bluish green luminous light that is reflected by the second reflecting mirror 145 and is incident on the second dichroic mirror 148 to be reflected by the second dichroic mirror 148 is complemented by the bluish green luminescent light that is reflected by the first dichroic mirror 141 and is incident on the second dichroic mirror 148 to be reflected by the second dichroic mirror 148. Thus, as shown in FIG. 6, the bluish green luminescent light that falls in the area A is allowed to be incident on the light tunnel 175 together with the light in the blue wavelength range that falls in the area B.

The light guiding optical system 140 has the collective lenses that are disposed between the dichroic mirrors and the reflecting mirrors. Further, the light guiding optical system 140 has a collective lens 173 that is disposed near the light tunnel 175 for collecting the light source lights to the incident port of the light tunnel 175.

Consequently, with the wheel motor 110 driven to rotate the optical plate 101, blue laser beams from the laser light emitting elements 71 that are the solid light emitting elements of the laser light source module 70 are shone on to the luminous light emitting portion 103 of the optical plate 101 as excitation light at timings at which the luminous light emitting portion 103 is positioned on the axis of the light that is emitted from the laser light source module 70 and that passes through the first dichroic mirror 141, so that light in the green wavelength range can be emitted from the green luminescent material applied to the luminous light emitting portion 103.

Then, when the blue laser beams from the laser light emitting elements 71 are shone on to the transmitting portion 104 at timings at which the transmitting portion 104 of the optical plate 101 is positioned on the axis of the light emitted from the laser light source module 70, the blue laser beams pass through the transmitting portion 104 while being diffused, whereby the diffused light in the blue wavelength range is emitted from the transmitting portion 104 of the optical plate 101 to the side that faces the front panel 12. Additionally, the luminous light in the green wavelength range that is emitted from the auxiliary luminescent portion 105 of the transmitting portion 104 is also emitted from the transmitting portion 104 to the side facing the back panel 13 as well as the side facing the front panel 12.

Then, the luminous light from the transmitting portion 104 that is emitted to the side facing the back panel 13 passes through the blue transmitting filter 109 that is provided on the surface of the transmitting portion 104 and then is reflected by the first dichroic mirror 141 and the second dichroic mirror 148 to thereby be incident on the light tunnel 175.

Additionally, the luminous light from the transmitting portion 104 that is emitted to the side facing the front panel 12 is reflected by the first reflecting mirror 143 on the surface of which the blue reflecting filter is provided and is then reflected by the second reflecting mirror 145, passing through the second dichroic mirror 148 to be incident on the light tunnel 175 together with the light in the blue wavelength range.

In this way, the driving of the wheel motor 110 that is the rotational driving device and the illumination of the laser light emitting elements 71 are controlled to be synchronized with each other by the light source control circuit 41 so as to control the illumination of the laser light emitting elements 71 of the light source module, so that the light in the green wavelength range is caused to be emitted from the luminous light emitting portion 103 of the optical plate 101. Thus, the light in the blue wavelength range that includes the luminous light in the green wavelength range can be emitted from the transmitting portion 104 of the optical plate 101 as the light in which the bluish green luminous light is contained in the light in the blue wavelength range.

Then, the light source control circuit 41 that is the light source control unit functions as a synchronization controller and controls the synchronization between the illumination of the laser light emitting elements 71 and the rotation of the wheel motor 110 of the luminous light emitting device 100. In combination with this synchronization control, the light source control circuit 41 also controls the synchronization of illumination of the red light emitting diode 121 of the red light source device 120.

Consequently, two of the three primary colors can be formed by the light in the green wavelength range that is emitted from the luminous light emitting portion 103 of the optical plate 101 and the light in the blue wavelength range containing the light in the green wavelength range that is emitted from the transmitting portion 104 of the optical plate 101. Further, the light in the red wavelength range emitted from the red light source device 120 is added to those lights to complete the lights of the three primary colors. Then, the lights of the three primary colors can be emitted from the light source unit 60 in a time-dividing fashion as light source lights, which can be shone on to the display element 51 via the light tunnel 175.

In this way, in the light source unit 60, the laser beams in the blue wavelength range can be emitted from the laser light emitting elements 71 of the laser light source module 70 via the transmitting portion 104 of the optical plate 101 as light forming a blue image. Additionally, the light having the wavelength in the green wavelength range that is longer than the wavelength of the light in the blue wavelength range can be emitted as light forming a green image from the luminescent material in the luminous light emitting portion 103 of the optical plate 101 by using the aforesaid laser beams as excitation light. Further, the light in the red wavelength range can be emitted from the red light source device 120 as light forming a red image. Additionally, this optical plate 101 includes the auxiliary luminescent portion 105 that is disposed on part of the transmitting portion 104, and therefore, when letting the light in the blue wavelength range from the laser light source module 70 that excites the luminescent material in the luminous light emitting portion 103 be light source light that forms a blue image, the luminous light from the auxiliary luminescent portion 105 that is formed on the transmitting portion 104 can be added to the light in the blue wavelength range that is emitted from the laser light emitting elements 71, whereby the resulting light can enhance the color reproduction in a projected image as the light having a wavelength range that is close to the blueness according to the sRGB.

Thus, the light in the blue wavelength range that is highly efficient as excitation light is emitted from the laser light source module 70 as excitation light for the luminous light emitting portion 103 that emits the light in the green wavelength range so as to enable the formation of a highly bright green image, and the luminous light is added to the light in the blue wavelength range from the laser light source module 70 to form a blue image. Additionally, a red image is formed by the light in the red wavelength range from the red light source device 120. Thus, a projected image is formed by the green, blue, and red images that are so formed, and therefore, the projector 10 utilizing the light source unit 60 can project a high-quality image that is bright and in which the colors are reproduced at a high level by using the images of the primary colors that are close to the three primary colors according to the sRGB.

The auxiliary luminescent portion 105 that is provided on the transmitting portion 104 is such that the luminescent material application area is controlled according to a wavelength component that is added to a wavelength component of the light in the blue wavelength range that is emitted from the laser light source module 70 and the intensity of the blue light so as to form an area of the luminescent material on part of the transmitting portion 104.

Further, by utilizing the blue transmitting filter 109 that corrects the wavelength component of the luminous light from the auxiliary luminescent portion 105 while transmitting the light in the blue wavelength range, even though the peak wavelength of the luminous light is not suitable for modifying the wavelength component of the light in the blue wavelength range that is emitted from the laser light emitting elements 71, the luminous light is corrected to be in a wavelength range that is suitable for modification of the chromaticity of the light in the blue wavelength range. Thus, the projector 10 can project a high-quality image in which the color reproduction is enhanced further in a projected image.

The position of the blue reflecting filter that is provided on the first reflecting mirror 143 is not limited to the surface of the first reflecting mirror 143, and hence, the blue reflecting filter can be provided in an appropriate position, for example a surface of the second reflecting mirror 145, on the optical path through which the light in the blue wavelength range passes between the optical plate 101 and the second dichroic mirror 148.

Second Embodiment

Hereinafter, a second embodiment will be described by the use of the accompanying drawings. Like reference numerals are given to constituent elements of the second embodiment that correspond to those of the first embodiment. Although the following embodiment has various preferred technical limitations for carrying out the invention, those technical limitations are not intended to limit the scope of the invention to the embodiment and an illustrated example.

Figure 7:
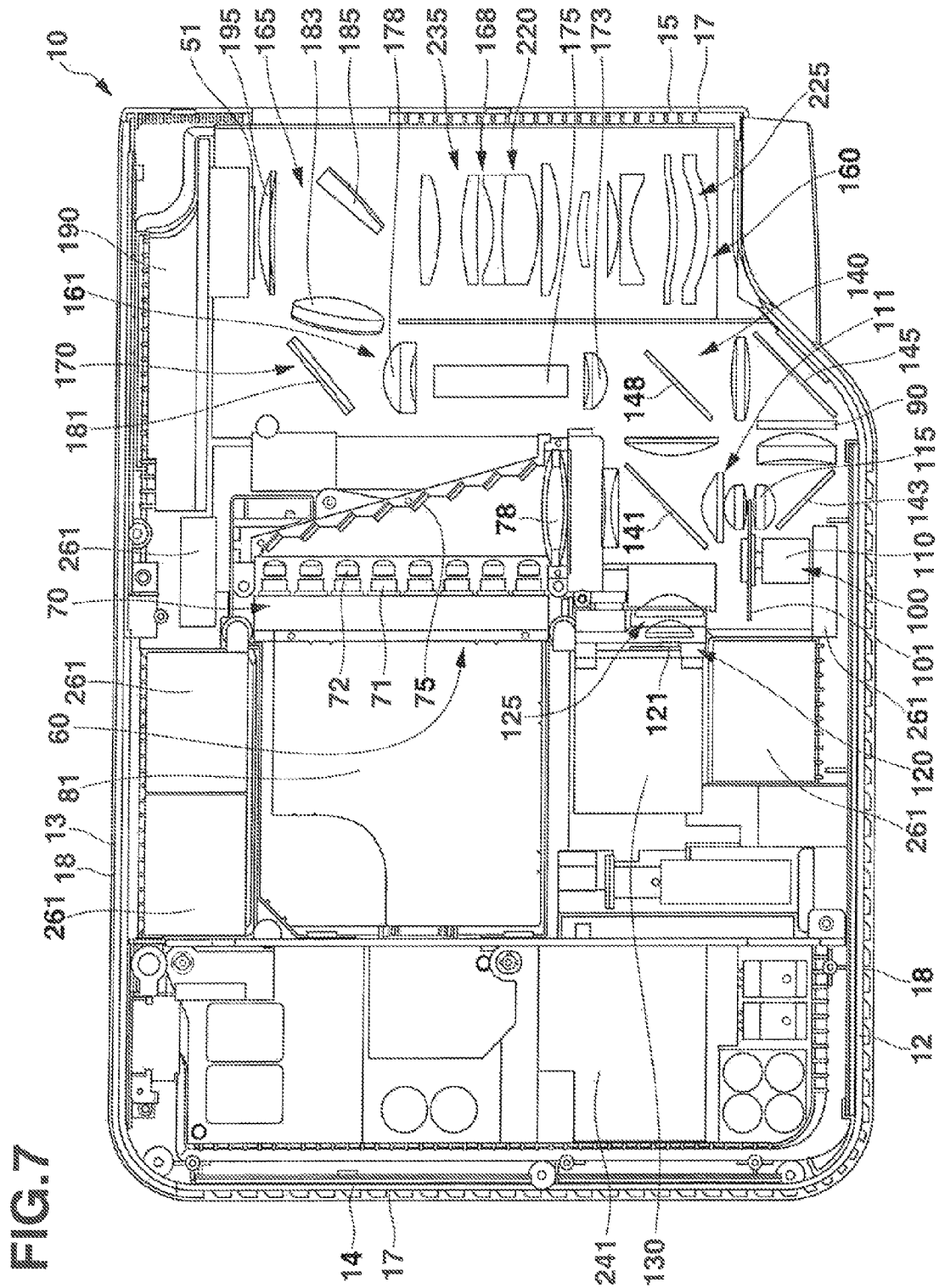
FIG. 7 is a plan view of a projector according to a second embodiment.

FIG. 7 is a plan view of a projector 10.

The second embodiment differs from the first embodiment in the configuration of an optical plate 101 (refer to FIG. 8) and in that a wavelength range adding filter 90 is provided between a lens and a second reflecting mirror 145 (refer to FIG. 7).

Figure 8:
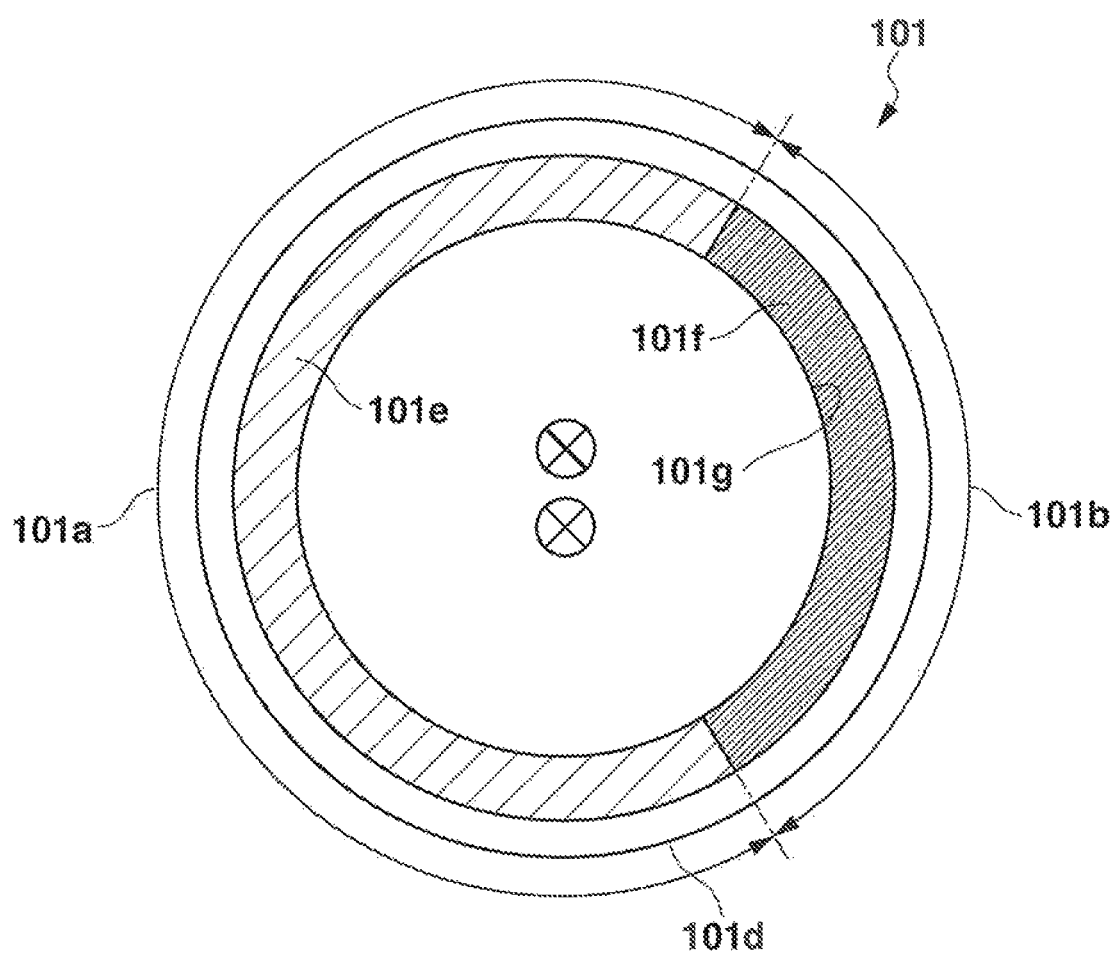
FIG. 8 is a plan view of an optical plate.

FIG. 8 is a plan view of the optical plate 101. A direction in which the optical plate 101 is seen in FIG. 8 is perpendicular to a direction in which the optical plate 101 is seen in FIG. 7. As shown in FIG. 8, the optical plate 101 has two segments that are aligned in an end-to-end fashion along a circumferential direction, and the two segments are divided into a first segment 101*a* and a second segment 101*b*. The first segment 101*a* is a luminescent area, and the second segment 101*b* is a light diffuse transmission area. The first segment 101*a* and the second segment 101*b* are provided on the same circumference.

This optical plate 101 has a wheel plate 101*d*, a luminescent material layer 101*e*, a diffuse transmission plate 101*f* and the like. A framework of the wheel plate 101*d* is a circular disc when roughly grasping the shape of the wheel plate 101*d*. A drive shaft of a wheel motor 110 is connected directly to the center of the wheel plate 101*d*. The drive shaft of the wheel motor 110 is parallel to an optical axis of a collective lens 78, and the wheel plate 101*d* is at right angles to the optical axis of the collective lens 78.

An opening 101*g* is formed in the wheel plate 101*d*, and the opening 101*g* extends in the circumferential direction. When referred to herein, the circumferential direction means a circumferential direction that is centered at the drive shaft of the wheel motor 110, and an axial direction means a direction in which the drive shaft of the wheel motor 110 extends.

The luminescent material layer 101*e* is excited to emit luminous light (green light) by blue light that is emitted from blue laser light emitting elements 71. The luminescent material layer 101*e* is formed on a surface of a front side of the wheel plate 101*d*. An joint interface between the luminescent material layer 101*e* and the wheel plate 101*d* is mirror finished so to enhance the utilization efficiency of luminous light that is emitted from the luminescent material layer 101*e*. The mirror finished surface on the front side of the wheel plate 101*d* is oriented towards the collective lens 78.

The luminescent material layer 101*e* is formed into an arc shape so as to extend in the circumferential direction. The luminescent material layer 101*e* and the opening 101*g* are provided in an end-to-end fashion in the circumferential direction, and the luminescent material layer 101*e* and the opening 101*g* are on the same rotating orbit or circular course as seen in the axial direction. Namely, as seen in the axial direction, the luminescent material layer 101*e* and the opening 101*g* are disposed on the same circumference that is centered at the drive shaft of the wheel motor 110. The portion where the luminescent material layer is formed corresponds to the first segment 101*a*.

The luminescent material layer 101*e* does not have to be formed into the arc-shaped strip. Hence, the luminescent material layer 101*e* may be formed over the whole of the surface on the front side of the wheel plate 101*d*. Alternatively, the luminescent material layer may be formed into a fan shape that is centered at the drive shaft of the wheel motor 110.

The disc-shaped diffuse transmission plate 101*f* is affixed to a surface on a back side of the wheel plate 101*d*, whereby the opening 101*g* is closed by the diffuse transmission plate 101*f*. A portion of the diffuse transmission plate 101*f* that closes the opening 101*g* corresponds to the second segment 101*b*.

When the luminescent material layer 101*e* passes through the axis of blue light while the blue laser light emitting elements 71 are illuminated, luminous light (green light) is emitted from the luminescent material layer 101*e*. When the diffuse transmission plate 101*f* in the opening 101*g* passes through the axis of blue light while the blue laser light emitting elements 71 are illuminated, the blue light passes through the diffuse transmission plate 101*f*, and the blue light is diffused when it passes through the diffuse transmission plate 101*f*.

When the rotating cycle of the optical plate 101 is equal to the cycle at which the blue laser light emitting elements 71 are turned on and off, the luminescent material layer 101*e* and the opening 101*g* pass through the axis of the blue light when the blue laser light emitting elements 71 are illuminated.

A first dichroic mirror 141 combines red light emitted by a red light emitting diode 121 with luminous light that is generated by the luminescent material layer 101e of the optical plate 101 into the same optical path.

The first dichroic mirror 141 reflects luminous light (green light) that is generated by the luminescent material layer 101e of the optical plate 101 towards a second dichroic mirror 148. By doing so, an optical path of the luminous light that is generated by the luminescent material layer 101e of the optical plate 101 is combined with an optical path of the red light that is emitted from the red light emitting diode 121.

A first reflecting mirror 143 is disposed on an opposite side to the first dichroic mirror 141 with respect to the optical plate 101. The first reflecting mirror 143 is a long wavelength cutoff filter and reflects light whose wavelength is shorter than a cutoff wavelength. Specifically, the first reflecting mirror 143 reflects blue light and transmits green light and red light whose wavelengths are longer than that of the blue light. The first reflecting mirror 143 is provided perpendicular to the first dichroic mirror 141. The first reflecting mirror 143 intersects obliquely the axis of the blue light that is emitted from the blue laser light emitting elements 71. Further, the first reflecting mirror 143 intersects obliquely the axis of the blue light that passes through the diffuse transmission plate 101f of the optical plate 101 at an angle of about 45°.

Figure 9:
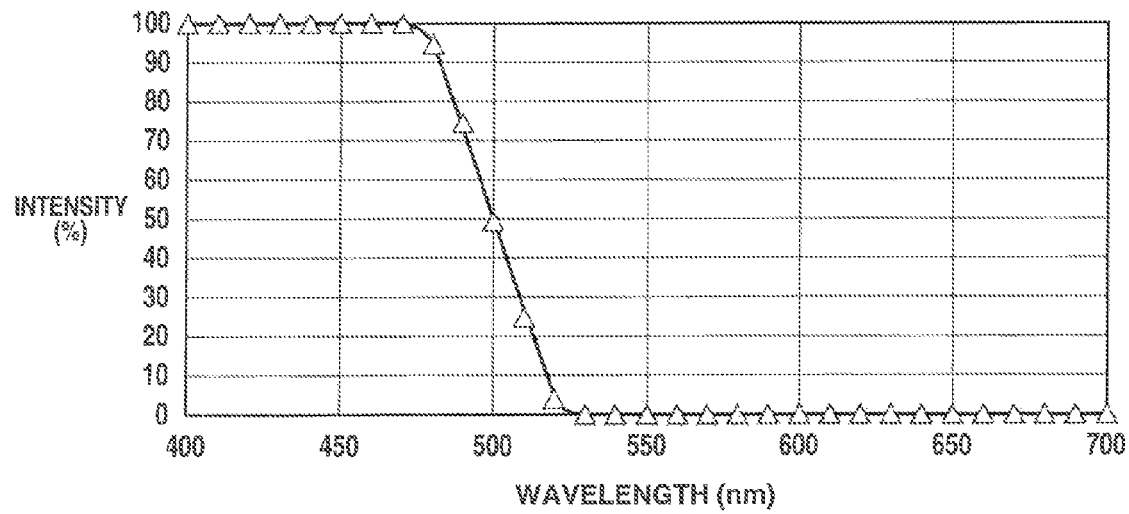
FIG. 9 is a chart showing a relationship between wavelength and reflectance factor of light that is reflected by a dichroic mirror.

FIG. 9 is a chart showing a relationship between wavelength and reflectance factor of light that is reflected by the first reflecting mirror 143. As shown in FIG. 9, the cutoff wavelength (a wavelength when the transmittance is 50%) of the first reflecting mirror 143 is 500 nm. The cutoff wavelength of the first reflecting mirror 143 is longer than a peak wavelength of the light emitted by the blue laser light emitting elements 71. Further, the cutoff wavelength of the first reflecting mirror 143 is longer than a longest wavelength in the wavelength range (the wavelength range where a half power or more of a largest intensity is obtained) of the light emitted by the blue laser light emitting elements 71.

The first reflecting mirror 143 reflects the blue light that passes through the diffuse transmission plate 101f of the optical plate 101 towards the wavelength range adding filter 90 and a second reflecting mirror 145. The axis of the blue light that is reflected by the first reflecting mirror 143 is parallel to the axes of the luminous light and the red light whose optical paths are combined by the first dichroic mirror 141. A traveling direction of the blue light that is reflected by the first reflecting mirror 143 is the same as traveling directions of the luminous light and the red light whose optical paths are combined by the first dichroic mirror 141.

Then, the wavelength range adding filter 90 is disposed between the first reflecting mirror 143 and the second reflecting mirror 145, which will be described later. The wavelength range adding filter 90 intersects the axis of the blue light that is reflected by the first reflecting mirror 143 (particularly, at right angles) and is provided on the optical path of the blue light.

The wavelength range adding filter 90 transmits the blue light that is reflected by the first reflecting mirror 143 and generates a wavelength range of which wavelengths are longer than the wavelength of the blue light by making use of the energy of the blue light (specifically, the wavelength range of green light).

Figure 10:
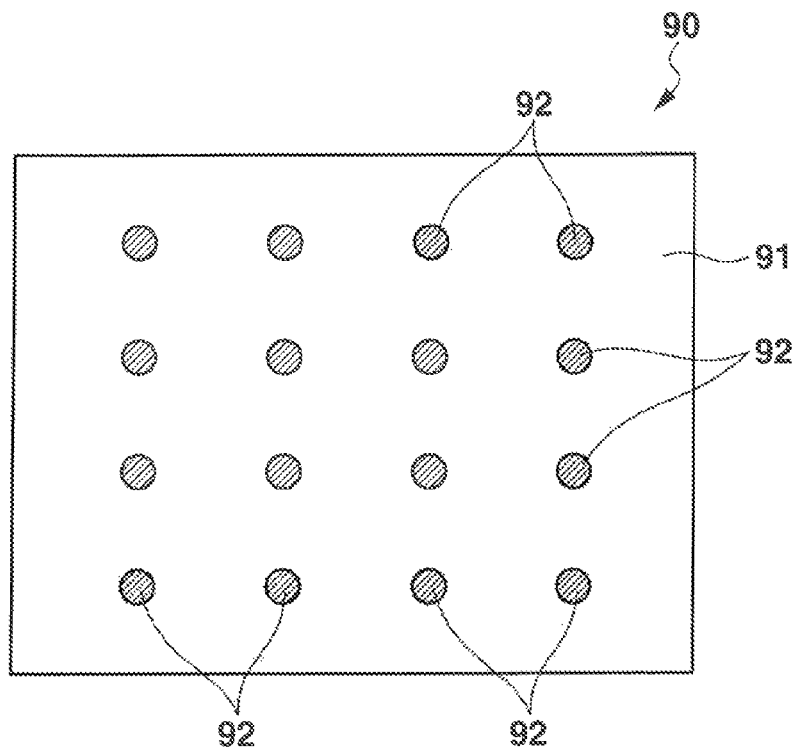
FIG. 10 is a plan view of a wavelength range adding filter.

FIG. 10 is a plan view of the wavelength range adding filter 90. As shown in FIG. 10, the wavelength range adding filter 90 has a transparent member 91 such as a transparent plate that transmits light without diffusing it and a plurality of luminescent materials 92 that are scattered or dispersed. Here, the plurality of luminescent materials 92 are affixed to one or the other surface or both the surfaces of the transparent member 91 and are aligned into a grid shape along the surfaces. The luminescent materials 92 may be dispersed in an interior space defined between the one surface and the other surface of the transparent member 91.

Figure 11:
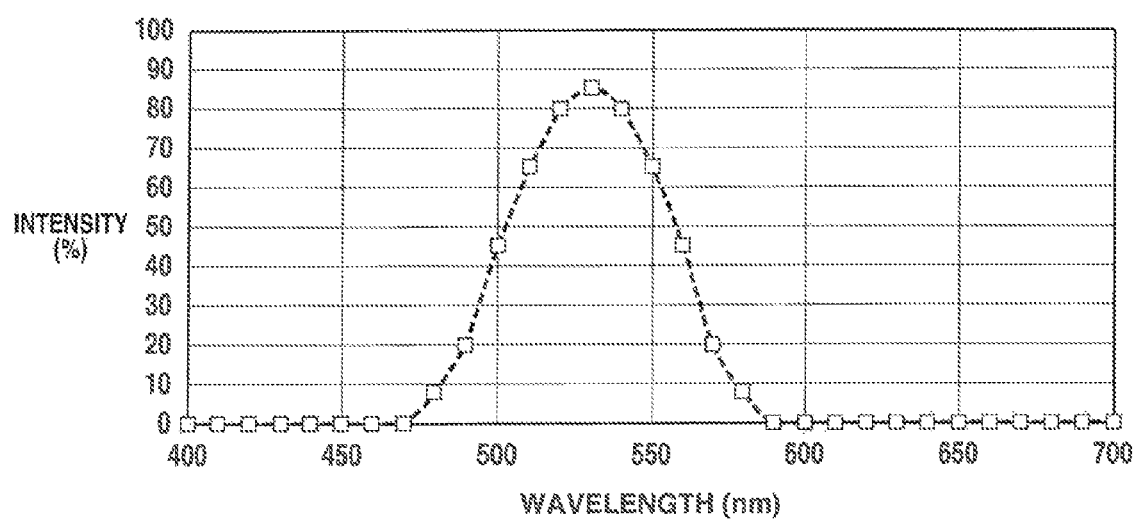
FIG. 11 is a chart showing a spectrum of luminous light emitted by a luminescent material of the wavelength range adding filter.

The luminescent materials 92 are excited by the blue light that is emitted from the blue laser light emitting elements 71 to emit luminous light (green light) whose wavelength is longer than that of the blue light. A spectrum of the luminous light that is emitted by the luminescent materials 92 is shown in FIG. 11. As shown in FIG. 11, a peak wavelength of the luminous light that is emitted by the luminescent materials 92 is in the range of 530 to 535 nm. A shortest wavelength in the wavelength range (the wavelength range where a half or more of the strongest intensity is obtained) of the luminous light that is emitted by the luminescent materials 92 is longer than the cutoff wavelength of the first reflecting mirror 143.

Since the luminescent materials 92 described above are provided on the transparent member 91, the spectrum of light that is emitted from the wavelength range adding filter 90 is such that the wavelength range of the luminous light (the luminous light emitted by the luminescent materials 92) whose wavelength is longer than the wavelengths in the wavelength range of the blue light that passes through the transparent member 91 to the wavelength range of the blue light. Consequently, the blue light emerging from the wavelength range adding filter 90 is more greenish than the blue light that is about to be incident thereon.

Since the luminous light radiates from the luminescent materials 92, the luminous light travels from the wavelength range adding filter 90 towards the first reflecting mirror 143. The luminous light arriving at the first reflecting mirror 143 is cut off by the first reflecting mirror 143. Consequently, the luminous light traveling towards the first reflecting mirror 143 is never combined again with the blue light at the second dichroic mirror 148.

The second reflecting mirror 145 is provided parallel to the first dichroic mirror 141. Similar to the first reflecting mirror 143, the second reflecting mirror 145 is a long wavelength cutoff filter and reflects light whose wavelength is shorter than its cutoff wavelength. Specifically, the second reflecting mirror 145 reflects blue light and transmits green light and red light whose wavelengths are longer than that of blue light. The second reflecting mirror 145 is provided perpendicular to the first reflecting mirror 142. The second reflecting mirror 145 intersects obliquely the axis of the light that is emitted from the wavelength range adding filter 90 (the light in which the wavelength range of the blue light is mixed with the wavelength range of the green light) at an angle of about 45°.

A relationship between wavelength and transmittance of light that is reflected by the second reflecting mirror 145 is the same as the relationship between wavelength and transmittance of light that is reflected by the first reflecting mirror 143 (refer to FIG. 9). Consequently, in the light that is emitted from the wavelength range adding filter 90, the blue light in the wavelength range that allows the blue light to pass through the transparent member 91 is reflected towards the second dichroic mirror 148 by the second reflecting mirror 145. In the light that is emitted from the wavelength range adding filter 90, part of the light emitted from the luminescent materials 92 and having the wavelength range that allows the light to pass through the transparent member 91 is reflected towards the second dichroic mirror 148 by the second reflecting mirror 145. The remaining portion is cut off by the second reflecting mirror 145. The blue light that is reflected by the second reflecting mirror 145 is more purplish than the blue light that is emitted from the wavelength range adding filter 90 but is more greenish than the blue light that is emitted from the blue laser light emitting elements 71.

The axis of the blue light that is reflected by the second reflecting mirror 145 intersects the axes of the green light and the red light whose optical paths are combined by the first dichroic mirror 141 at right angles.

The wavelength range adding filter 90 according to the second embodiment is described as being made up of the two areas, the transparent member 91 that transmits the blue light and the luminescent materials 92 that generates the wavelength range of green light. However, the invention is not limited thereto, and hence, a configuration may be adopted in which the wavelength range adding filter 90 is made up of only one area and the wavelength of light that passes through the wavelength range adding filter 90 is converted to a wavelength (whose peak is in the range of 460 to 464 nm) that is close to real blue.

While the invention has been described by reference to the embodiments, the embodiments are presented as examples and are not intended at all to limit the scope of the invention. These novel embodiments can be carried out in other various forms, and various omissions, replacements or modifications can be made without departing from the spirit and scope of the invention. These embodiments and modifications thereof are included in the spirit and scope of the invention and are also included in the scope of inventions described under claims and their equivalents.

What is claimed is:

1. A light source unit comprising:
   a solid light emitting element that emits light in the blue wavelength range;
   a luminous light emitting portion on which a luminescent material layer is laid out, the luminescent material layer using the light emitted from the solid light emitting element as excitation light to emit light in a wavelength range of which wavelengths are longer than a wavelength of the excitation light; and
   a light transmitting portion that transmits the light emitted from the solid light emitting element, the transmitting portion being provided at a different position than the luminous light emitting portion;
   wherein:
   an area of a luminescent material that emits luminous light in the green wavelength range is provided at part of the light transmitting portion;
   the transmitting portion comprises a transparent member; and
   the light source unit further comprises:
   an optical plate on which the luminous light emitting portion and another transmitting portion that is different from the transmitting portion are provided in an end-to-end fashion in the circumferential direction, the optical plate being disposed so that the luminous light emitting portion or said another transmitting portion is positioned on an optical path of the light emitted from the solid light emitting element; and
   a wavelength range adding filter that includes areas of the transparent member and the luminescent material layer, the wavelength range adding filter being provided on an optical path of the light in the blue wavelength range that passes through the other said another transmitting portion;
   a first reflecting mirror that is provided on an optical path of the light in the blue wavelength range that is emitted from the solid light emitting element to pass through said another transmitting portion at a position on the optical path at a first side of the wavelength range adding filter to be between the optical plate and the wavelength range adding filter, wherein the first reflecting mirror cuts off a peak wavelength of the green light that is emitted by the luminescent material; and
   a second reflecting mirror that is provided on the optical path of the light in the blue wavelength range that is emitted from the solid light emitting element to pass through said another transmitting portion at a position on the optical path on a second side of the wavelength range adding filter opposite from the first side, wherein the second reflecting mirror cuts off the peak wavelength of the green light that is emitted by the luminescent material.

2. The light source unit according to claim 1, wherein a diffuse plate is mounted on said another transmitting portion.

3. The light source unit according to claim 1, wherein the luminescent material layer that is laid out on the luminous light emitting portion emits light in the green wavelength range.

4. The light source unit according to claim 1, further comprising:
   a solid light emitting element that emits light in the red wavelength range.

5. The light source unit according to claim 1, further comprising:
   a rotational driving device that rotates the optical plate in the circumferential direction.

6. A projector comprising:
   the light source unit according to claim 1;
   a display element that generates projection light;
   a light source-side optical system that guides light emitted from the light source unit to the display element;
   a projection-side optical system that guides the projection light generated at the display element; and
   a projector control unit that controls the display element and the light source unit.

7. A light source unit comprising:
   a solid light emitting element that emits light in the blue wavelength range;
   an optical plate on which a luminous light emitting portion and a light transmitting portion are provided in an end-to-end fashion in the circumferential direction, the optical plate being disposed so that the luminous light emitting portion or the transmitting portion is positioned on an optical path of the light emitted from the solid light emitting element, wherein the luminous light emitting portion comprises a luminescent material layer which uses the light emitted from the solid light emitting element as excitation light to emit light in a wavelength range of which wavelengths are longer than a wavelength of the excitation light, and wherein the transmitting portion transmits the light emitted from the solid light emitting element;
   a wavelength range adding filter that includes areas of a transparent member and a luminescent material that emits luminous light in the green wavelength range, the wavelength range adding filter being provided on an optical path of the light in the blue wavelength range that passes through the transmitting portion;
   a first reflecting mirror that is provided on an optical path of the light in the blue wavelength range that is emitted from the solid light emitting element to pass through the transmitting portion at a position on the optical path at a first side of the wavelength range adding filter to be between the optical plate and the wavelength range adding filter, wherein the first reflecting mirror cuts off a peak wavelength of the green light that is emitted by the luminescent material; and a second reflecting mirror that is provided on the optical path of the light in the blue wavelength range that is emitted from the solid light emitting element to pass through the transmitting portion at position on the optical path on a second side of the wavelength range adding filter opposite from the first side, wherein the second reflecting mirror cuts off the peak wavelength of the green light that is emitted by the luminescent material.

* * * * *